United States Patent
Barbara et al.

(10) Patent No.: US 11,928,520 B2
(45) Date of Patent: Mar. 12, 2024

(54) CHANGE-PROPOSAL FUNCTIONS IN CONFIGURATION MANAGEMENT SYSTEMS

(71) Applicant: Google LLC, Mountain View, CA (US)

(72) Inventors: Justin Santa Barbara, Atlanta, GA (US); Brian Grant, Mountain View, CA (US); Martin Maly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/815,206

(22) Filed: Jul. 26, 2022

(65) Prior Publication Data
US 2023/0367642 A1 Nov. 16, 2023

Related U.S. Application Data

(60) Provisional application No. 63/364,654, filed on May 13, 2022.

(51) Int. Cl.
*H04L 12/00* (2006.01)
*G06F 8/65* (2018.01)
(Continued)

(52) U.S. Cl.
CPC .............. *G06F 9/5055* (2013.01); *G06F 8/65* (2013.01); *G06F 8/71* (2013.01)

(58) Field of Classification Search
CPC . G06F 9/5055; G06F 8/65; G06F 8/71; G06F 9/451; G06F 9/45533; H04L 41/20;
(Continued)

(56) References Cited

U.S. PATENT DOCUMENTS

| 8,775,577 B1 * | 7/2014 | Alford | H04L 41/082 |
| | | | 717/176 |
| 2010/0228836 A1 * | 9/2010 | Lehtovirta | H04L 12/00 |
| | | | 709/248 |

(Continued)

FOREIGN PATENT DOCUMENTS

WO   WO-2021164261 A1 *  8/2021   ............. H04L 43/50

*Primary Examiner* — Frantz Coby
(74) *Attorney, Agent, or Firm* — Honigman LLP; Brett A. Krueger

(57) ABSTRACT

Operations of a method include receiving a configuration request requesting configuration management of a base configuration package that describes infrastructure of an application. The operations include determining, for the base configuration package, a plurality of package functions. Each package function of the plurality of package functions extends functionality of the base configuration package. The operations include determining, for the base configuration package and the plurality of package functions, a change-proposal function. The change-proposal function proposes one or more of the plurality of package functions to extend the functionality of the base configuration package. The operations include transmitting, to a user device, the change-proposal function and receiving, from the user device, approval of the change-proposal function. In response to receiving approval of the change-proposal function, the operations include configuring the base configuration package using the one or more of the plurality of package functions proposed by the change-proposal function.

20 Claims, 5 Drawing Sheets

(51) Int. Cl.
*G06F 8/71* (2018.01)
*G06F 9/50* (2006.01)

(58) Field of Classification Search
CPC .............. H04L 41/0883; H04L 41/082; H04L 41/0809
USPC ................................ 709/220, 221, 223, 248
See application file for complete search history.

(56) References Cited

U.S. PATENT DOCUMENTS

| | | | |
|---|---|---|---|
| 2011/0055544 A1* | 3/2011 | Vidal ........................ | G06F 8/71 713/100 |
| 2011/0107299 A1* | 5/2011 | Dehaan ............... | G06F 9/45533 718/1 |
| 2014/0115655 A1* | 4/2014 | Marvais .............. | H04L 41/0809 726/1 |
| 2014/0317253 A1* | 10/2014 | Alford .................... | H04L 41/20 709/221 |
| 2015/0317286 A1* | 11/2015 | Wang ...................... | G06F 9/451 715/788 |
| 2016/0105321 A1* | 4/2016 | Thakkar .............. | H04L 41/0883 709/220 |
| 2016/0269227 A1* | 9/2016 | Alford .................... | H04L 41/20 |

\* cited by examiner

CHANGE-PROPOSAL FUNCTIONS IN CONFIGURATION MANAGEMENT SYSTEMS

CROSS REFERENCE TO RELATED APPLICATIONS

This U.S. patent application claims priority under 35 U.S.C. § 119(e) to U.S. Provisional Application 63/364,654, filed on May 13, 2022. The disclosure of this prior application is considered part of the disclosure of this application and is hereby incorporated herein by reference in its entirety.

TECHNICAL FIELD

This disclosure relates to change-proposal functions in configuration management systems.

BACKGROUND

Application programming interfaces (APIs) describe and power a significant portion of computing as manual operations are replaced by automation. Configuration management deals with safely creating and changing the settings that describe the desired state of API-driven systems. These configurations can describe computing infrastructure or the software versions and settings that run on top of that infrastructure, etc. The process for managing that configuration is traditionally managed on a case-to-case basis, manually, and with limited application of automation.

SUMMARY

One aspect of the present disclosure provides a computer-implemented method that when executed on data processing hardware causes the data processing hardware to perform operations that include receiving a configuration request requesting configuration management of a base configuration package that describes infrastructure of an application. The operations include determining, for the base configuration package, a plurality of package functions. Each package function of the plurality of package functions extends functionality of the base configuration package. The operations include determining, for the base configuration package and the plurality of package functions, a change-proposal function. The change-proposal function proposes one or more of the plurality of package functions to extend the functionality of the base configuration package. The operations include transmitting, to a user device, the change-proposal function and receiving, from the user device, approval of the change-proposal function. In response to receiving approval of the change-proposal function, the operations include configuring the base configuration package using the one or more of the plurality of package functions proposed by the change-proposal function.

Implementations of the disclosure may include one or more of the following optional features. In some implementations, the infrastructure of the application includes a distributed computing system. In some examples, the change-proposal function specifies an argument of the one or more of the plurality of package functions proposed by the change-proposal function. Optionally, the change-proposal function limits possible values of an argument of the one or more of the plurality of package functions proposed by the change-proposal function.

In some implementations, the transmitted change-proposal function causes the user device to display the transmitted change-proposal function on a graphical user interface (GUI) executing on the user device. In some examples, the approval of the change-proposal function includes a change to the change-proposal function. Optionally, determining the change-proposal function includes applying a validation function to the change-proposal function. The validation function tests each package function against one or more rules.

In some implementations, determining the change-proposal function includes determining, for each respective change-proposal function of a plurality of change-proposal functions, a respective score, and selecting the change-proposal function based on each respective score. In some examples, determining the change-proposal function includes evaluating, using a model, a plurality of historical configurations of the base configuration package. In further examples, the plurality of historical configurations include metadata representative of deployment behavior.

Another aspect of the present disclosure provides a system including data processing hardware and memory hardware in communication with the data processing hardware. The memory hardware stores instructions executed on the data processing hardware causing the data processing hardware to perform operations. The operations include receiving a configuration request requesting configuration management of a base configuration package that describes infrastructure of an application. The operations include determining, for the base configuration package, a plurality of package functions. Each package function of the plurality of package functions extends functionality of the base configuration package. The operations include determining, for the base configuration package and the plurality of package functions, a change-proposal function. The change-proposal function proposes one or more of the plurality of package functions to extend the functionality of the base configuration package. The operations include transmitting, to a user device, the change-proposal function and receiving, from the user device, approval of the change-proposal function. In response to receiving approval of the change-proposal function, the operations include configuring the base configuration package using the one or more of the plurality of package functions proposed by the change-proposal function.

Implementations of the disclosure may include one or more of the following optional features. In some implementations, the infrastructure of the application includes a distributed computing system. In some examples, the change-proposal function specifies an argument of the one or more of the plurality of package functions proposed by the change-proposal function. Optionally, the change-proposal function limits possible values of an argument of the one or more of the plurality of package functions proposed by the change-proposal function.

In some implementations, the transmitted change-proposal function causes the user device to display the transmitted change-proposal function on a graphical user interface (GUI) executing on the user device. In some examples, the approval of the change-proposal function includes a change to the change-proposal function. Optionally, determining the change-proposal function includes applying a validation function to the change-proposal function. The validation function tests each package function against one or more rules.

In some implementations, determining the change-proposal function includes determining, for each respective change-proposal function of a plurality of change-proposal functions, a respective score, and selecting the change-proposal function based on each respective score. In some examples, determining the change-proposal function includes evaluating, using a model, a plurality of historical configurations of the base configuration package. In further examples, the plurality of historical configurations include metadata representative of deployment behavior.

The details of one or more implementations of the disclosure are set forth in the accompanying drawings and the description below. Other aspects, features, and advantages will be apparent from the description and the drawings, and from the claims.

DESCRIPTION OF DRAWINGS

Like reference symbols in the various drawings indicate like elements.

DETAILED DESCRIPTION

Figure 1:
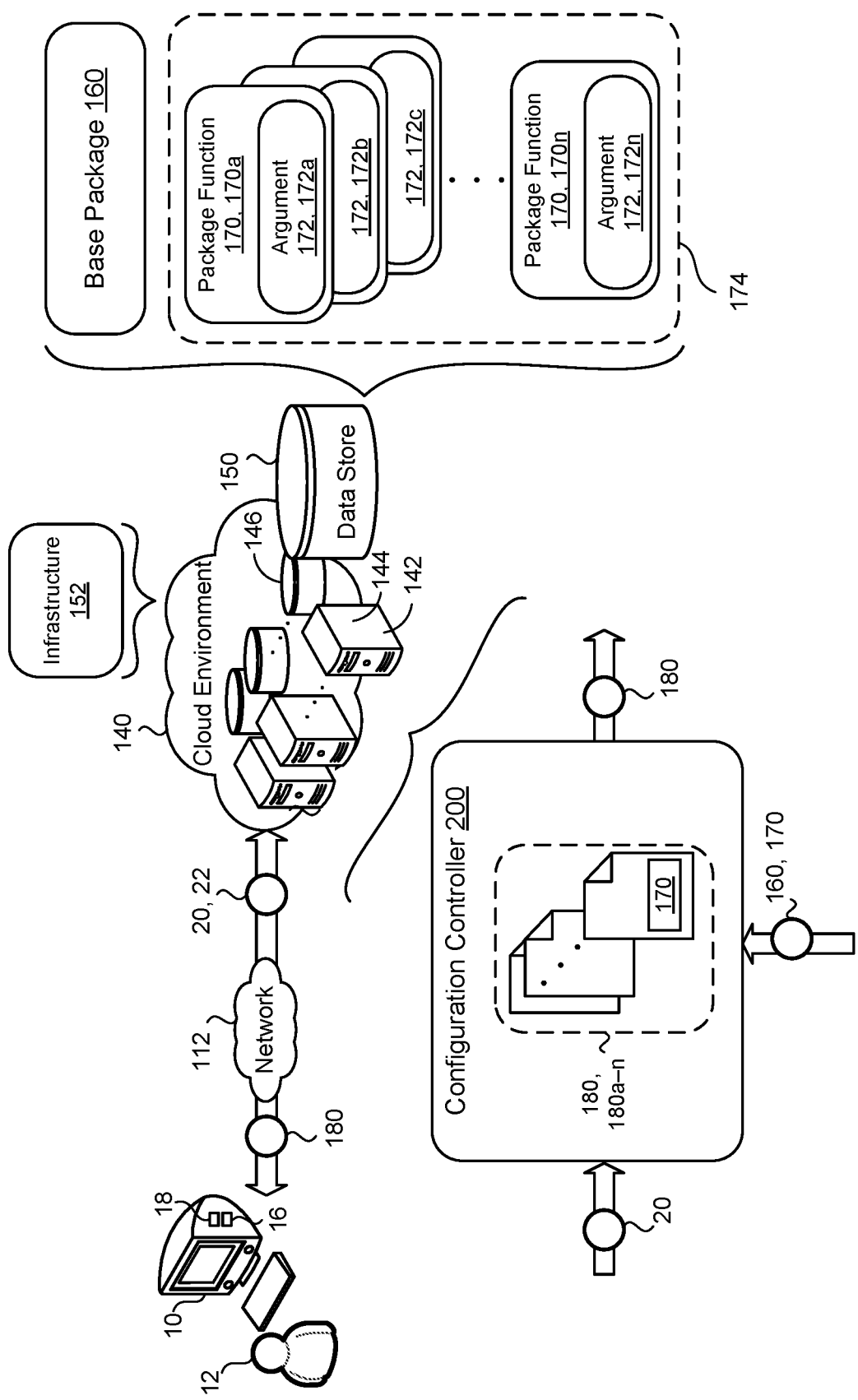
FIG. 1 is a schematic view of an example system for determining change-proposal functions for a configuration management system.

Application programming interfaces (APIs) describe and power a significant portion of computing as manual operations are replaced by automation. Configuration management deals with safely creating and changing the settings that describe the desired state of API-driven systems. These configurations can describe computing infrastructure, the software versions and settings that run on top of that infrastructure, and the like. The process for managing that configuration is traditionally managed on a case-to-case basis, manually, and with limited application of automation. Moreover, the limited automation is typically only applied to workflows, rather than the construction or verification of the configuration itself. Manual configuration is generally more expensive and leads to errors and oversights, which cause outages and makes computing overall more expensive and less efficient.

There are limited conventional tools for generating configuration, and typically these are, at best, monolithic and based around templated configuration. These templated systems are difficult to maintain, particularly if the systems must express a variety of configuration options as every possible option is exposed in a "simplified" surface, which may result with an API of comparable complexity and lower quality and lower consistency. In other words, configurations are developed as a single unit and composability is difficult. This leads to an "over-parameterization problem" and thus, these approaches are resistant to automation and optimization.

For example, users of a traditional, template-based platform must carefully consider how they want to consume shared packages. Often, the users "fork" upstream packages so that they can simplify it to fit their needs. In other words, the package or template is considered a starting point for authoring a distinct package, rather than a true opportunity for configuration collaboration and reuse. When users manually alter upstream configuration packages, they are then responsible for ongoing maintenance and typically do not automatically receive improvements made to the upstream packages. This in turn makes the upstream package less useful because there is no incentive to share or publish back. In other words, the monolithic nature of traditional configuration bundles acts as a barrier to efficient collaboration as all changes must be made to that monolithic location and all changes must be careful to be compatible with all other changes. Thus, both creation and maintenance or modification of traditional template-based platforms requires time-intensive, manual input by a user.

Implementations herein are directed toward a configuration management system that splits configuration into three separate layers: a first layer that includes a base package of configuration, a second layer that includes functions that can extend the base package, and a third layer that includes proposal-functions that can guide the application of functions to the base package. That is, the proposal-functions curate package functions to apply to a base package configuration to provide user-guided and/or automated creation and modification of configurations of infrastructure. Thus, the configuration management system described herein reduces configuration time, complexity, and the potential for errors during infrastructure setup and modification.

Referring to FIG. 1, in some implementations, an example configuration management system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients e.g., the user device 10) or the computing resources 144. The data store 150 may store one or more base packages 160 with each base package 160 having one or more package functions 170, 170a-n. The base configuration packages 160 and package functions 170 stored on the storage resources 146 of the remote system 140 may execute on the computing resources 144 of the remote system 140. Each base package 160 describes computing infrastructure 152 of an application or system. For example, one or more of the base package 160 may configure or provision cloud infrastructure 152, such as part of a containerized orchestration system (e.g., servers, virtual machines, load balancers, storage, processing, etc.). Each package function 170 is capable of extending or defining the functionality of the base package 160 and any number of package functions 170 may be applied to the base package 160 at a given time or iteration or instance of the base package 160. Thus, the base package 160 is defined or modified by one or more package functions 170 to configure infrastructure 152 of, for example, the remote system 140. Any number of base packages 160 and package functions 170 may be stored at the data store 150 at any point in time.

The remote system 140 is configured to receive a configuration request 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The configuration request 20 requests that the remote system 140 configure a base package 160 (e.g., identified by the request 20) using one or more of the package functions 170.

The remote system 140 executes a configuration controller 200. The configuration controller 200, in response to receiving the configuration request 20, determines and proposes (or optionally, automatically applies) changes to the base package 160 to satisfy the configuration request 20. Using the base package 160 and the associated package functions 170, the configuration controller 200 determines one or more change-proposal functions 180. Each change-proposal function 180 proposes one or more of the package functions 170 to extend the functionality of the base package 160. That is, each change-proposal function 180 includes a selection of one or more of the package functions 170 to expand or change the functionality of the base package 160. Each package function 170 may include one or more arguments 172, 172a-n that are provided to the package function 170 to obtain a result. Each change-proposal function 180 may specify or limit the arguments of the package functions 170. For example, the change-proposal function 180 specifies a Boolean argument as true or limits an integer argument to a range between one and ten. In other words, the change-proposal function 180 includes one or more package functions 170 to be applied to or incorporated by the base package 160 to adjust or change functionality of the base package 160 to achieve a desired provisioning and/or configuration of infrastructure 152 (e.g., of the remote system 140 or any other computing infrastructure). The change-proposal function 180 may define parameters or arguments 172 included in the package functions 170 of the change-proposal function 180 to further define the configuration according to the configuration request 20.

The base package 160 is simplified as compared to traditional template-based alternatives because the base package 160 needs only to provide the lowest-common denominator configuration of infrastructure 152 whereas traditional templates must provide every possible configuration. That is, because the base package 160 does not include all (or even any) alternative configurations of the application infrastructure 152, the base package 160 itself is maintained while one or more package functions 170 modify or expand functionality of the base package 160. This creates a more automated and scalable development model, where different users 12 configuring independent data stores 150 on the shared remote system 140 can collaborate and consume only the relevant aspects of configuration.

For example, when the base package 160 does not include specialized adaptations (i.e., one or more package functions 170) necessary for a specific user's configuration (as defined by the configuration request 20), such as privacy protocols required for a compliance regime, the configuration controller 200 may determine and/or select a change-proposal function 180 including one or more package functions 170 that, when integrated with the base package 160, incorporates the adaptations needed to support the required protocols. Thus, the base package 160 is shared among users 12 of the remote system 140 with unique selections or combinations of package functions 170 modifying the base package 160 for individual users 12. In this way, the configuration controller 200 maintains and updates the base package 160 as necessary so that all users 12 may receive updates to the base package 160 without affecting functionality of their application infrastructure 152.

The package functions 170 describe alternative and/or additional configurations and are able to directly, minimally, and naturally express the changes to the base package 160. The package functions 170 may be stored at the remote system 140 (e.g., at the data store 150) and are called by the change-proposal function 180 to expand/change the base package 160 as necessary. That is, a catalog 174 of package functions 170 may be stored at the remote system 140 so that the configuration controller 200, in determining the change-proposal function 180, selects package functions 170 from the catalog 174 to expand/change the base package 160. The users 12 may author or otherwise generate package functions 170 to store at the remote system 140 for subsequent use with the base package 160.

Each package function 170 includes one or more arguments 172 (i.e., parameters) that at least partially define the effect of the package function on the base package 160. When selected by the configuration controller 200 for a change-proposal function 180, one or more arguments 172 for the selected package functions 170 can be adjusted or parameterized to fulfill the configuration request 20. That is, the change-proposal function 180 specifies the argument 172 of the package function 170 according to the request 20.

The catalog 174 is accessible by multiple users 12 using the remote system 140 so that each user 12 has access to the same package functions 170. Optionally, a subset of package functions 170 on the catalog 174 may be accessible by a subset of users 12, such as if a user 12 generates a package function 170 and configures the package function 170 to only be accessible by subscribers or users 12 on a local network 112. User-generated package functions 170 can also be made accessible to all users 12 on the remote system 140.

In determining or generating the change-proposal function 180, the configuration controller 200 receives the request 20 and, based on the request 20, determines one or more package functions 170 that, alone or in combination, satisfy the request 20. For example, the configuration controller 200 selects the package functions 170 based on the arguments 172 of the package functions 170. As described in more detail below, the package functions 170 are configured (e.g., the arguments 172 are defined) and ordered as necessary for the change-proposal function 180 to fulfill the request 20 and the change-proposal function 180 is executed to apply the package functions to the base package 160. Optionally, the change-proposal function 180 proposes direct changes to package functions 170 (i.e., beyond constraining arguments 172), though this can be modeled as a change-proposal function 180 that allows applying patches to the package functions 170 or base package 160.

Not all package functions 170 may be compatible with the instance of the base package 160 operated or controlled by the user 12. For example, some package functions 170 available do not allow the base package 160 to provide the output or functionality desired by the configuration request 20, or the package functions 170 are not compatible with protocols required by the user 12 or network 112 or other package functions 170 already modifying the base package 160. Thus, the change-proposal function 180, in some implementations, only includes package functions 170 that are compatible with the current iteration of the base package 160.

Figure 2:
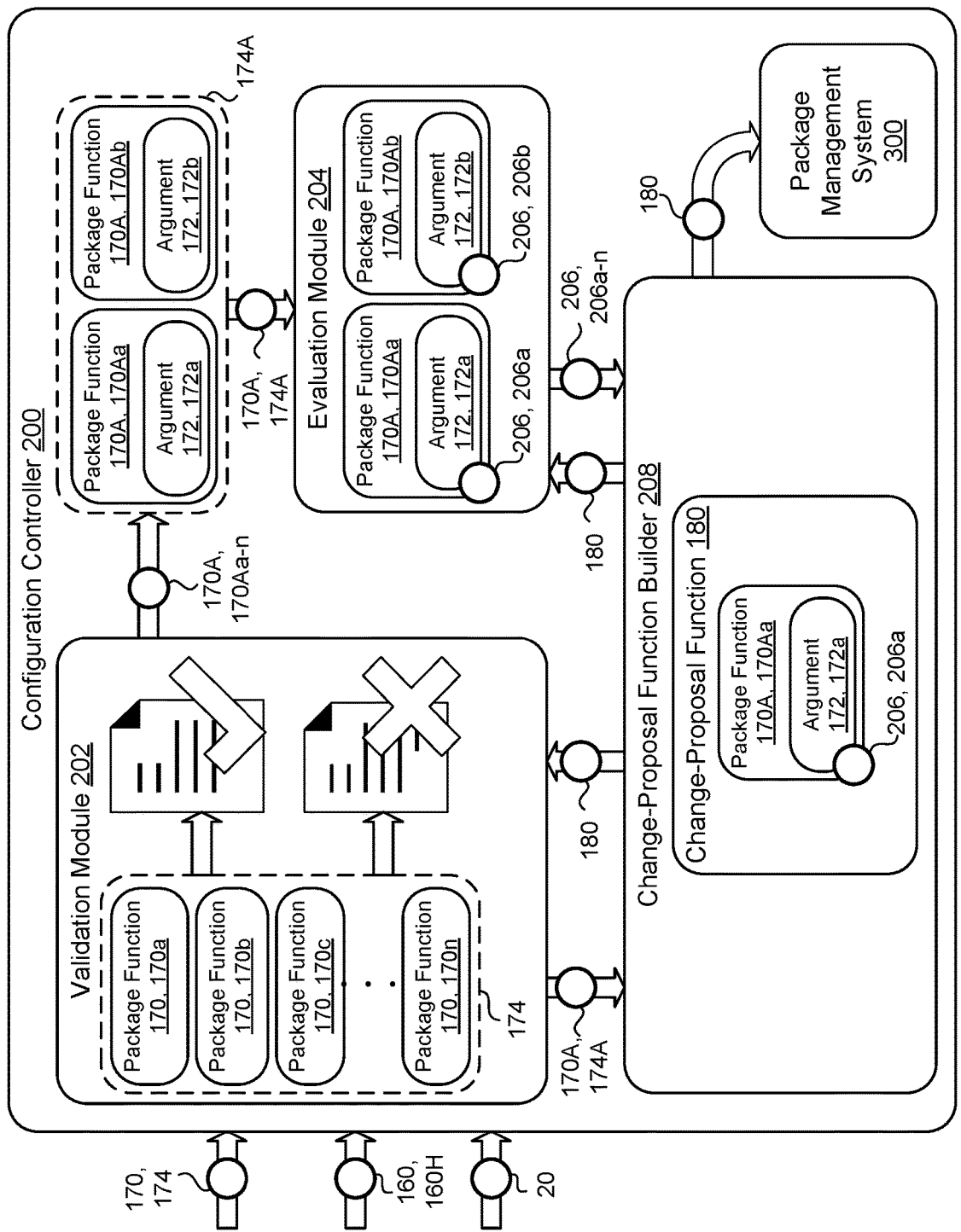
FIG. 2 is a schematic view of a configuration controller of the example system of FIG. 1 determining the change-proposal functions.

Referring now to FIG. 2, the configuration controller 200 receives or obtains the request 20, the base package 160, and package functions 170 (or a representation of the package functions in the form of the catalog 174) and the configuration controller 200 determines the change-proposal function 180 based on the request 20, the base package 160, and/or the package functions 170. In other words, the configuration controller 200 selects one or more package functions 170 to curate one or more change-proposal functions 180 that, when applied to the base package 160, configure the base package 160 based on the request 20. The configuration controller 200 determines the package functions 170 and the change-proposal function 180 by determining compatible or approved or successful package functions 170 using a validation module 202. The configuration controller 200 scores or ranks success and/or effectiveness of the package functions 170 and change-proposal function using an evaluation module 204.

That is, the configuration controller 200 includes the validation module 202 to determine the package function(s) 170 from the catalog 174 that can be applied to the base package 160 (i.e., approved package functions 170A, 170Aa-n) and the package functions 170 that cannot be applied to the base package 160. For example, the validation module 202 generates a catalog of approved package functions 170A (i.e., an approved catalog 174A), where the approved catalog 174A includes individual package functions 170 or groups of individual package functions 170 that may be used to satisfy the request 20. The approved package functions 170A are determined based on the package functions 170 actively applied to the base package 160, the arguments 172 of those package functions 170, the request 20, local network protocols, and the like.

The configuration controller 200 may choose or select one or more of the approved package functions 170A (or combination of approved package functions 170A) because the package function 170A operationally satisfies the request 20 and does not violate any rules associated with the base package 160 or data store 150. For example, when an existing package function 170 requires that data shared on the remote system 140 running the base package 160 remain encrypted, the validation module 202 only accepts or approves package functions 170 that satisfy the request 20 and that maintain the encryption requirement (or the validation module 202 rejects all package functions 170 that would allow unencrypted data sharing and then evaluates the remaining package functions 170 to determine those that operationally satisfy the request 20). Thus, in some examples, at least some of the change-proposal functions 180 are only proposed to the user 12 when the package functions 170 determined by the change-proposal function are compatible with the base package 160 and/or remote system 140 and if the package functions 170 satisfy the request 20.

In some implementations, the configuration controller 200 operates the evaluation module 204 to determine or generate a score 206, 206a-n for each package function 170 or each approved package function 170A. Optionally, the evaluation module 204 evaluates determined change-proposal functions 180 and determines scores 206 for each change-proposal function 180. The scores 206 are associated with the respective package functions 170 or change-proposal functions 180 to aid in evaluation and selection of the determined change-proposal functions 180. The determined scores 206 are generated based on any suitable metric, such as computational complexity of the package functions 170, the number of package functions 170 in a change-proposal function 180, the ability of the change-proposal function 180 to satisfy the configuration request 20, the level of compliance of the change-proposal function 180 with the base package 160, the malleability of the base package 160 after the respective change-proposal function 180 is applied (i.e., the ease with which additional package functions 170 can be applied), and the like.

Based on the approved package functions 170A determined by the validation module 202 and the scores 206 determined by the evaluation module 204, a change-proposal function builder 208 of the configuration controller 200 builds or determines one or more change-proposal functions 180. The determined change-proposal functions 180 may be communicated to the user 12 for approval and/or executed to modify the base package 160. The change-proposal function builder 208 may determine the change-proposal functions 180 based on a variety of factors. For example, the builder 208 determines the change-proposal functions 180 having a score 206 that satisfies a threshold score (e.g., is above or below the threshold score), the builder 208 determines change-proposal functions 180 having the most (or conversely, the fewest) package functions 170 to satisfy the request 20, etc. The builder 208 may, while determining the change-proposal functions 180, communicate with the validation module 202 to ensure the determined change-proposal functions satisfy the request 20 and communicate with the evaluation module 204 to score combinations of package functions 170 and change-proposal functions 180. Because the builder 208 remains in communication with the validation module 202, the validation module 202 is able to determine the compatibility of the change-proposal function 180 before the change-proposal function 180 is implemented with the base package 160.

When validating or evaluating a potential package function 170, the configuration controller 200 may parameterize or define one or more arguments 172 of the package function 170 and base the results (i.e., the approved package functions 170A or the scores 206) off only those defined arguments 172. In this way, the configuration controller 200 automates defining the arguments 172 so that the user 12 does not need to manually define the arguments 172 when the package function 170 is proposed to the user 12. Further, the configuration controller 200 defines the arguments 172, in some examples, in a way that optimizes the score 206 or that satisfies the request 20. In some implementations, the configuration controller 200 only proposes a change-proposal function 180 to the user 12 when the configuration controller 200 defines the arguments 172 in one or more specific ways during building of the change-proposal function 180.

Optionally, when determining the change-proposal function 180, the configuration controller 200 considers metadata representative of historical configurations of the base package 160, 160H. That is, in some implementations, the change-proposal function 180 is determined based on historical base packages 160H previously used by the user 12 submitting the request 20 and/or any other user 12 that previously used the same or similar base package 160. For example, the historical base packages 160H identify package functions 170 that are preferred by the user 12 or that are known to have a high success rate (e.g., when used by other user 12) when implemented with the base package 160. The historical base packages 160H may be stored on the remote system 140 and accessed by the configuration controller 200 when determining the change-proposal functions 180.

With continued reference to FIG. 2, the validation module 202 may consider the package functions 170 of the catalog 174 to determine the approved package functions 170A compatible with the request 20, the base package 160, and any other considerations. As shown, the configuration controller 200 determines a first approved package function 170Aa defined by a respective first argument 172*a* and a second approved package function 170Ab defined by a respective second argument 172*b*. The defined arguments 172 of the package functions 170 may be a requirement for the package functions 170 to be determined compatible for the change-proposal function 180.

Here, only the approved package functions 170A are processed by the evaluation module 204 to determine respective scores 206, but the entire catalog 174 of package functions 170 may be scored to determine the change-proposal function 180. The first score 206*a* associated with the first approved package function 170Aa and the second score 206*b* associated with the second approved package function 170Ab identify the capacity of the package functions 170 to satisfy the request 20. Based on the approved catalog 174A and the scores 206 associated with the package functions 170, the change-proposal function builder 208 determines one or more change-proposal functions 180 to propose to the user 12. In this example, the change-proposal function 180 includes only the first approved package function 170Aa defined by the first argument 172*a* and having the associated first score 206*a*, but the change-proposal function 180 may include any number of package functions 170 or the change-proposal function builder 208 may propose any number of change-proposal functions 180. The determined change-proposal functions 180 may be managed by a package management system 300 of the configuration controller 200 for proposing implementation of the change-proposal functions 180 to the user 12, processing user input regarding the proposed change-proposal functions 180, and/or managing execution of approved change-proposal functions 180 to apply the package functions 170 to the base package 160.

Thus, the configuration controller 200, in some examples, applies a validation function to determine whether a proposed change (i.e., a specific package function 170 or a change-proposal function 180) is acceptable against "in-house" (e.g., the remote system 140) rules. Moreover, the evaluation module 204 evaluates whether a proposed change (i.e., a specific package function 170 or a change-proposal function 180) is beneficial to the objectives of the request 20 (or better than an existing configuration), or evaluate the change-proposal functions 180 to determine the most optimal change-proposal function(s) 180. For example, a request 20 is received to generate instances of the base package 160 in multiple geographies across the remote system 140, and the evaluation module 204 generates the scores 206 based on financial costs of executing the instances using different change-proposal functions 180.

Figure 3:
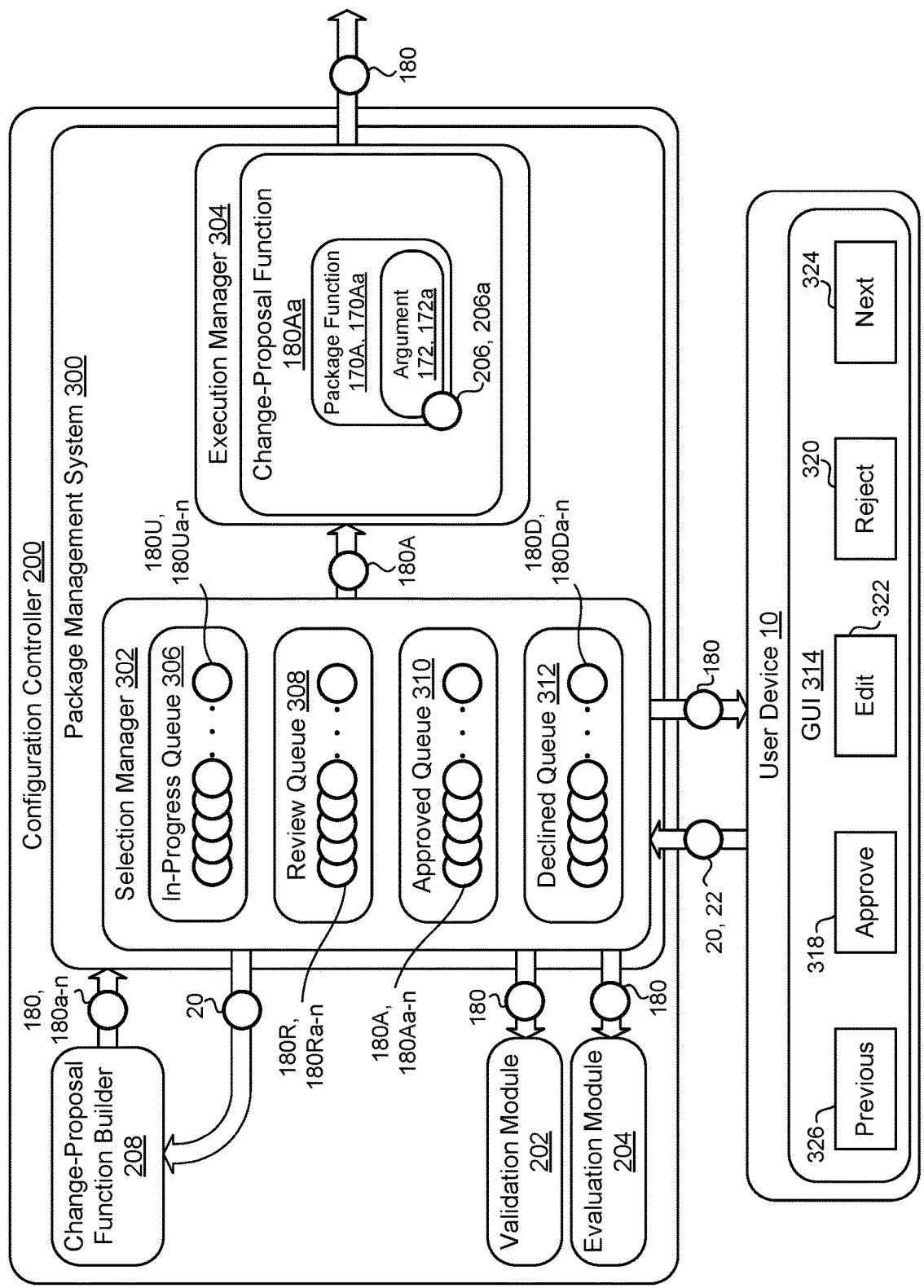
FIG. 3 is a schematic view of the configuration controller managing selection and execution of change-proposal functions based on user inputs received at a graphical user interface (GUI) operating on a user device.

Referring to FIG. 3, the configuration controller 200, in some implementations, determines the change-proposal function 180 at the change-proposal function builder 208 and the package management system 300 receives the change-proposal function 180 to manage proposal of the change-proposal function 180 to the user 12, the execution of approved change-proposal functions 180, and/or the request of new, amended, and additional change-proposal functions 180. Thus, the package management system 300 manages when and how the base package 160 is modified by the change-proposal functions 180 based on, for example, user input or the package functions 170 of pending change-proposal functions 180. In other words, the package management system 300 manages packages of configurations in various lifecycle states (e.g., drafts, in-review, and approved packages), including execution of the change-proposal functions 180. The package management system 300 may manage a plurality of change-proposal functions 180, 180*a-n* at once.

As shown, the package management system 300 receives the change-proposal functions 180 and sorts them into one or more queues via a selection manager 302. For example, the selection manager 302 tracks change-proposal functions 180 that are currently being determined by the change-proposal function builder 208 or edited by the user 12 in an in-progress queue 306. Thus, the in-progress queue 306 tracks change-proposal functions 180 that are incomplete or in-progress or otherwise unable to be applied to the base package 160 (i.e., unacceptable change-proposal functions 180U, 180Ua-n). In some implementations, the unacceptable change-proposal functions 180U include change-proposal functions 180 that were determined by the validation module 202 to be incompatible with the request 20 or base package 160.

The selection manager 302 manages change-proposal functions 180 that are completed and ready for review by the user 12 (i.e., reviewable change-proposal functions 180R, 180Ra-n) in a review queue 308. Reviewable change-proposal functions 180R can be approved for implementation with the base package 160 (i.e., approved change-proposal functions 180A, 180Aa-n) or declined for implementation with the base package (i.e., declined change-proposal functions 180D, 180Da-n). The approved change-proposal functions 180A are sorted in an approved queue 310 and the declined change-proposal functions 180D are sorted in a declined queue 312.

Approved change-proposal functions 180A may be communicated to the execution manager 304 for implementation with the base package 160. That is, once change-proposal functions 180 are approved, the execution manager 304 may pull the approved change-proposal functions 180A for incorporation with the base package 160. The execution manager 304 may implement the approved change-proposal functions 180A one at a time, in a given order defined by the approved queue 310, or the execution manager 304 may pull groups of approved change-proposal functions 180A for implementation at once. For example, the execution manager 304 may pull all approved change-proposal functions 180A present in the approved queue 310 at a defined time interval or once a threshold number of approved change-proposal functions 180A are in the approved queue 310.

Reviewable change-proposal functions 180R are approved by a user 12 (such as via user input at a graphical user interface (GUI) 314 executed by a user device 10) or reviewable change-proposal functions 180R may be automatically approved by the selection manager 302. The selection manager 302 may distinguish between reviewable change-proposal functions 180R that must be approved by the user 12 (or more than one user 12) and those that may be automatically approved, such as based on the request 20. For example, the request 20 might require a change to the base package 160 to be completed in the most efficient manner. Once the configuration controller 200 determines the change-proposal function 180 has an associated score 206 identifying it as the most efficient and/or successful change-proposal function 180, the selection manager 302 may automatically submit the change-proposal function 180 to the execution manager 304 for implementation with the base package 160. When the request 20 specifies that the efficiency of the determined change-proposal function 180 needs to be approved by the user 12 before implementation, the change-proposal function 180 will be communicated to the user(s) 12 who must approve the change-proposal function 180 before submitting the change-proposal function 180 to the execution manager 304.

Unacceptable change-proposal functions 180U that the validation module 202 determines to be incompatible with the request 20 may be reconsidered by the validation module 202 so that, if a change to the base package 160 allows the change-proposal function 180 to be implemented with the base package 160, the change-proposal function 180 may be categorized as a reviewable change-proposal function 180R. Thus, the selection manager 302 may communicate change-proposal functions 180 to the validation module 202 to determine, for example, whether unacceptable change-proposal functions 180U have become compatible or as a check to verify compatibility of approved change-proposal functions 180A before implementation with the base package 160.

The change-proposal functions 180 may be sorted in the queues and retrieved by the selection manager 302 (such as for proposing to the user 12 or for queueing to be executed by the execution manager 304) in any suitable order. For example, the change-proposal functions 180 may be sorted based on the score 206 associated with the change-proposal function 180 or based on an order of implementation set by the user 12. Thus, the selection manager 302 communicates with the evaluation module 204 to determine and verify scores 206 associated with change-proposal functions 180. For example, the user 12 may provide an input at the GUI to allow for automatic approval of all change-proposal functions 180 having at least a threshold score 206.

Additionally or alternatively, the selection manager 302 generates requests 20 for new, additional, or modified change-proposal functions 180 to be determined by the change-proposal function builder 208. The requests 20 generated by the selection manager 302 may in addition to any request 20 received from the user and may be prompted in response to receiving a request 20 from the user, by additional user input (such as at the GUI 314), and/or prompted by the approval or execution of a previous change-proposal function 180. As discussed above, the requests 20 may result in determination of one or more change-proposal functions 180 for one or more existing base packages 160 and/or creation of one or more new base packages 160 with or without package functions 170.

When the request 20 triggering the change-proposal function 180 is user-prompted, the selection manager 302 may communicate one or more change-proposal functions 180 to the user 12 via the GUI 314 for selection or approval by the user 12. For example, the selection manager 302 receives a request 20 from the user 12 requesting a change to the base package 160. If the selection manager 302 determines that no change-proposal function 180 in the review queue 308 (or any of the other queues) satisfies the request 20, the selection manager 302 may generate a request 20 to determine a change-proposal request that will satisfy the request 20. Conversely, if the configuration request 20 from the user 12 requests a change to the configuration that is already set to occur based on the queued change-proposal functions 180, the selection manager 302 may ignore the request 20 or prioritize the change-proposal function 180 set to fulfill the request 20. In other words, the selection manager 302 determines whether an input received from the user 12 requires the configuration controller 200 to determine a change-proposal function 180.

In submitting inputs to generate the configuration request 20, the user 12 does not need to be specific to or even have knowledge of the package functions 170 or change-proposal function 180 that may be applied to the base package 160. In other words, the package functions 170 and change-proposal functions 180 may not be easily interpretable or identifiable and the user 12 can trigger determination of suitable change-proposal functions 180 without specifically identifying the necessary components and without having the skills or abilities to create or parse the package functions 170. Instead, the user 12 may input a desired outcome of the change-proposal function 180 (i.e., a desired end state of the base package 160) and the configuration controller 200 determines the change-proposal function 180 necessary to achieve the desired outcome. Similarly, change-proposal function 180 may be determined and presented in a way suitable for interpretation by the user 12 and for application to the base package 160. For example, the change-proposal functions 180 may be determined using domain specific languages (DSLs), which optionally use templates, to simplify the task of creating change-proposal functions 180 without requiring the abilities or resources of manual coding.

In some implementations, the configuration request 20 defines arguments 172 or specifies an output or desired end state of the infrastructure 152. In such implementations, the configuration request 20 does not directly select package functions 170 or specifically approve a change-proposal function 180. Instead, the defined arguments 172 or desired end state of the configuration request 20 instructs the configuration controller 200 to determine the change-proposal function 180 by selecting package functions 170 that satisfy the request 20. For example, the configuration request 20 may require that a first group of users of the data store 150 should have access to only a first subset of data stored on the remote system 140 and that a second group of users should have access to only a second subset of the data. Rather than specifying the location of the subsets of data on the remote system 140 and manually applying security protocols to those locations, the configuration request 20 may simply define categories of the subsets of data and the configuration controller 200 may select package functions 170 capable of determining locations of the subsets of data and assigning access rights to the respective groups of users. The change-proposal function 180 may also intuitively or automatically add a package function 170 that updates access rights for users when users are added to the system or moved between groups, such as based on standard practices or a known protocol that such switching does not require administrator approval, or the like. Similarly, if the base package 160 includes a package function 170 that one of the subsets of data contains sensitive information that requires prior approval to access, one of the new package functions 170 may be chosen that enables access approval capabilities.

In some implementations, the approval or implementation of one or more change-proposal functions 180 triggers the approval, implementation, or creation of a request 20 for additional change-proposal functions 180. When the triggered change-proposal functions 180 are applied to the same instance of the base package 160 as the triggering change-proposal function 180, the subsequently determined change-proposal functions 180 may be constructive (i.e., intended to build upon the package functions 170 of the first determined change-proposal function 180) or substitutive (i.e., intended to replace, substitute, or further define the package functions 170 of the first determined change-proposal function 180). For example, a first change-proposal function 180 generates a request 20 for subsequent change-proposal functions 180 that may collectively be proposed to the user 12 at once, where the first change-proposal function 180 addresses the initial request 20 of the user 12 and the subsequent change-proposal function 180 is a recommendation for additional configuration changes. Optionally, the subsequent change-proposal functions 180 may be determined and executed without approval of the user 12 based on any user's approval of similar or prior change-proposal functions 180.

In some implementations, the approval or implementation of the change-proposal function 180 for a first instance of the base package 160 triggers the approval or implementation of the same or similar change-proposal function 180 with a second, existing instance of the base package 160. For example, a user 12 may operate similar base packages 160 on the remote system 140 where separate instances are responsible for different geographic regions. When the user 12 approves implementation of a change-proposal function 180 for the base package 160 of one geographic region, the selection manager 302 suggests or implements the same or similar change-proposal function 180 with other base packages 160 of other geographic regions, where necessary components (such as the arguments 172) of the additional change-proposal functions 180 are tailored for the specific base packages 160.

In some implementations, the approval or implementation of the change-proposal function 180 for a first instance of the base package 160 triggers creation of a second instance of the base package and, optionally, the implementation or approval of the same or similar change-proposal functions 180 for the second, created instance of the base package 160. In other words, an approved or executed change-proposal function 180 may also aid in instance creation, where the user 12 may be prompted to permit creation of another instance of the base package 160 and including package functions 170 chosen or generated by the change-proposal function 180 that are specific to the pending instance. For example, a category of instance for the base package 160 may be commonly associated with one or more other categories of instance for the base package 160, such as creating separate instances of the base package 160 under development, stage, and production settings where, for example, the base package 160 and package functions 170 are repeated between instances, but with differently defined arguments 172. Thus, when the selection manager 302 recognizes that if the request 20 generates a first type of instance of the base package 160 configured in a first way, then the user 12 will also generate a second type of instance of the base package 160 configured in a second way, responsive to determining that the user 12 has created the first instance, the selection manager 302 may determine a change-proposal function 180 having one or more package functions 170 to be applied to a second instance of the base package 160 and prompt the user 12 to approve or deny creation of the second instance.

Generating and/or executing change-proposal functions 180 beyond the scope of the original request 20 may be referred to as speculative execution. There is no limit as to how expansive the speculative execution could be, or how minute the details might be for speculative execution. In other words, determinations of change-proposal functions 180 could result in extensive chains of change-proposal functions 180 having package functions 170 with defined arguments 172, all collectively expressed in a near infinite number of ways. Speculative execution may utilize historical statistics, artificial intelligence (AI), machine learning (ML), and the like to make proposals based on corpuses of configurations and prior changes and proposals, including metadata about whether those changes were moved forward by users, whether they were eventually approved for deployment, and how they behaved in the real world environment.

In other words, in determining whether the change-proposal function 180 triggers a request 20 for additional change-proposal functions, the selection manager 302 may consider historical base packages 160, other active base packages 160 on the remote system 140, and trends and trajectories such as those determined using AI or ML.

Because speculative execution could result in an undesirable or unmanageable number of change-proposal functions 180 for the user 12 or selection manager 302 to consider, the selection manager 302 may limit the determined change-proposal functions 180 in number, complexity, and/or extent to which it will change the base function, and the like. For example, the selection manager 302 only proposes change-proposal functions 180 having a score 206 above a threshold or only a configurable number (e.g., three, five, ten, etc.) change-proposal functions 180 with the highest scores 206.

Furthermore, because the change-proposal function 180 is sometimes automatically generated or does not satisfy the request 20, the user 12 may opt to decline or deny the change-proposal function 180 or the user 12 may adjust the change-proposal function 180 manually (such as by redefining arguments 172 of the package functions 170). Furthermore, the user 12 may be presented with multiple change-proposal functions 180 where only one or a subset of change-proposal functions 180 need be implemented. For example, acceptance and implementation of a first change-proposal function 180 might decline implementation of a second change-proposal function 180 and trigger a proposal or implementation of a third change-proposal function 180.

Before applying the change-proposal function 180 to the base package 160, the user 12 may be prompted to approve or deny or amend the change-proposal function 180. In some implementations, the configuration controller 200 determines multiple change-proposal functions 180 that each satisfies the request 20 in a different way. For example, a first change-proposal function 180a includes a first package function 170a with a first argument 172a and a second change-proposal function 180b includes a second package function 170b with a second argument 172b. Both change-proposal functions 180a, 180b satisfy the request 20, but with different outcomes or future trajectories of the base package 160. Thus, in these examples, the user 12 is prompted to choose between the first change-proposal function 180a and the second change-proposal function 180b.

In some examples, the configuration controller 200 transmits the change-proposal functions 180 to the user device 10. The user device 10 (e.g., via the GUI 314 executing on the user device 10) displays the change-proposal functions 180 to the user 12. The configuration controller 200 may receive a selection 22 from the user device 10 selecting one or more of the change-proposal functions 180. Using the selected change-proposal functions 180, the configuration controller 200 may configure the base package 160 using the package functions 170 used by the change-proposal functions 180 selected by the user 12. In other implementations, the configuration controller 200 automatically selects one or more of the change-proposal functions 180 without input from the user 12. For example, the configuration controller 200 scores each change-proposal function 180 (e.g., via historical configurations of the base package 160) and selects one or more of the change-proposal functions 180 that satisfy a threshold.

The selection manager 302 communicates the change-proposal functions 180 to the user 12 via the GUI 314 executing on the user device 10. The GUI 314 allows the user 12 to visualize the change-proposal function 180, such as via a description of the change to the base package 160 that will occur if the change-proposal function 180 is implemented or other interpretable medium, like a graphic icon, readable code, and the like. The GUI 314 receives various user inputs and communicates requests 20 and selections 22 to the configuration controller 200 based on the user inputs. For example, the user 12 approves a presented change-proposal function 180 via an approval input 318 and declines or rejects a presented change-proposal function 180 via a rejection input 320. The user 12 may edit a change-proposal function 180 (such as by defining the arguments 172 of package functions 170) or generate a request 20 via an editing input 322 at the GUI 314. Furthermore, the user 12 may scroll through the options presented by the package management system 300 via scrolling inputs (such as a next input 324 and a previous input 326).

Thus, users 12 of the systems will typically be presented with change-proposal functions 180 in the GUI 314, and can choose to move forward with one or more change-proposal functions 180, or can modify them before moving forward. They might also ignore or reject change-proposal functions 180 altogether. The abstraction of having this extra step allows for change-proposal functions 180 to be more speculative. That is, it is rarely the case that the configuration controller 200 should always perform a certain action, and now, through speculative execution, automation can be used throughout the broader and more ambiguous are of general configuration management.

Where a traditional template-based system would require the user 12 to manually input values for arguments 172, a change-proposal function 180 can propose invoking a package function 170 with some or all of the arguments 172 specified (or at least bounded or narrowed). A change proposal-function 180 may propose multiple applications of the same package function 170, such as for development, stage, and production environments. This allows for more automation and less human toil. There can also be increased confidence in change-proposal functions 180 that are automatically generated rather than human-driven proposals. There can be confidence that the proposals have been consistently applied across all packages and not just to those chosen by a human operator, that the rules can be codified without need for constant interpretation, and that there are not human errors (e.g., typos, mistakes, or oversights) in the creation of the changes.

Figure 4:
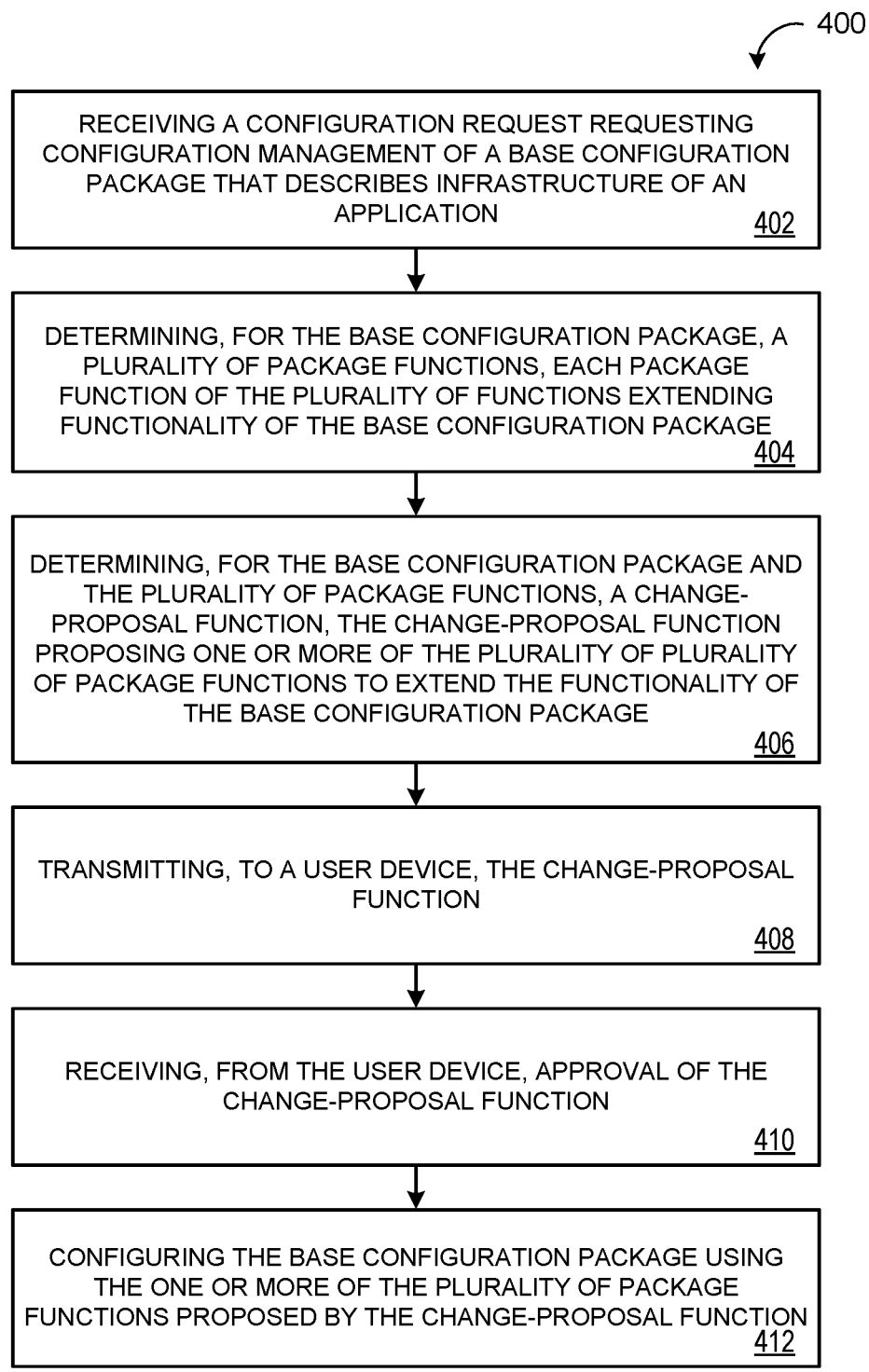
FIG. 4 a flowchart of an example arrangement of operations for a method of providing change-proposal functions in a configuration management system.

FIG. 4 is a flowchart of an exemplary arrangement of operations for a method 400 of providing change-proposal functions in configuration management systems. The computer-implemented method, when executed by data processing hardware, causes the data processing hardware to perform operations that include, at step 402, receiving a configuration request 20 requesting configuration management of a base package 160 that describes infrastructure 152 of an application. The operations include, at step 404, determining, for the base package 160, a plurality of package functions 170. Each package function 170 of the plurality of package functions 170 extends functionality of the base package 160. At step 406, the operations include determining, for the base package 160 and the plurality of package functions 170, a change-proposal function 180. The change-proposal function 180 proposes one or more of the plurality of package functions 170 to extend the functionality of the base package 160. The operations include, at step 408 transmitting, to a user device 10, the change-proposal function and, at step 410, receiving, from the user device 10, approval of the change-proposal function 180. The operations also include, at step 412, in response to receiving approval, configuring the base package 160 using the one or more of the plurality of package functions 170 proposed by the change-proposal function 180.

Figure 5:
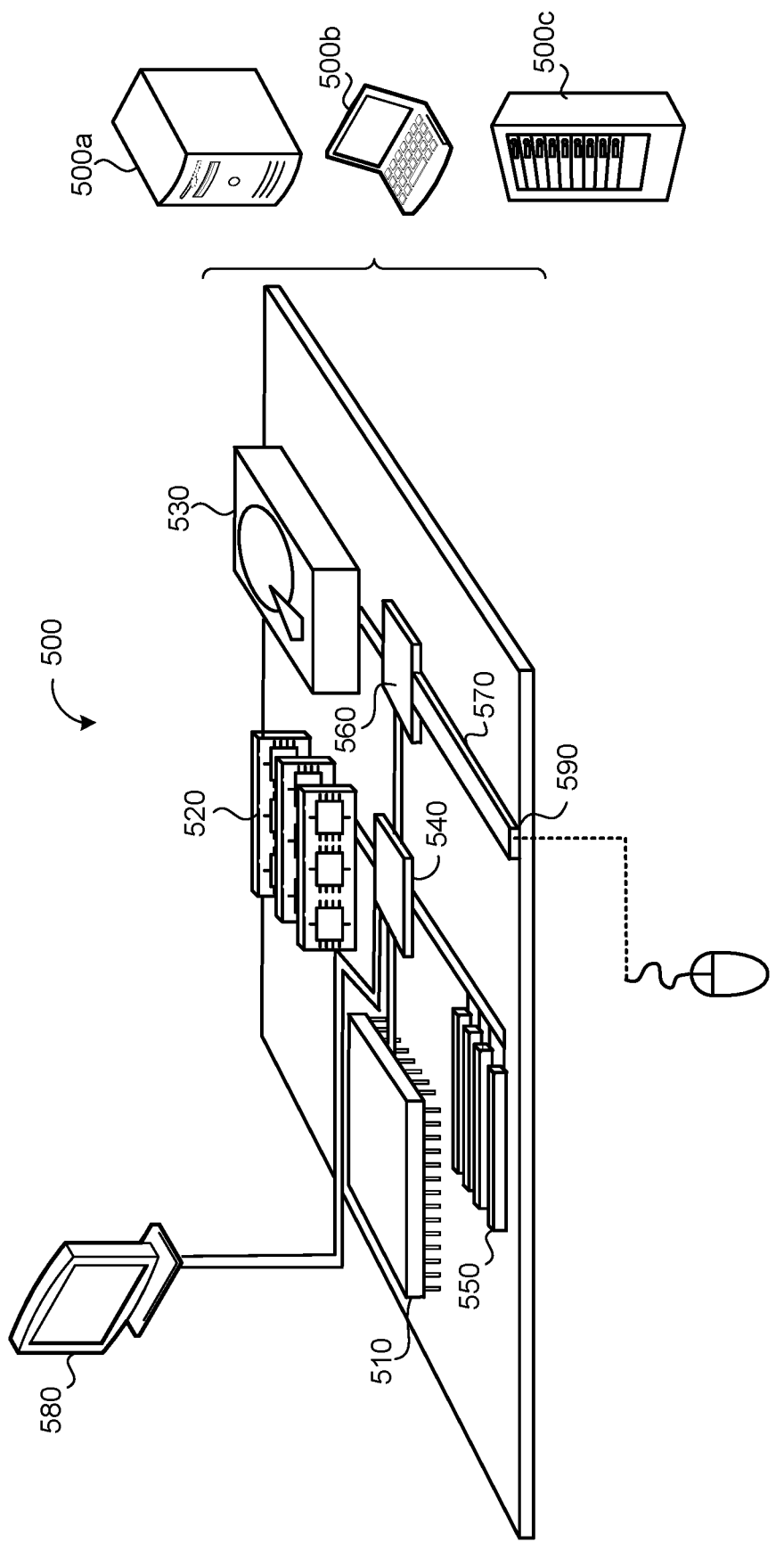
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a configuration request requesting configuration management of a base configuration package that describes infrastructure of an application;
   determining, for the base configuration package, a plurality of package functions, each package function of the plurality of package functions extending functionality of the base configuration package;
   determining, for the base configuration package and the plurality of package functions, a change-proposal function, the change-proposal function proposing one or more of the plurality of package functions to extend the functionality of the base configuration package;
   transmitting, to a user device, the change-proposal function;
   receiving, from the user device, approval of the change-proposal function; and in response to receiving approval of the change-proposal function, configuring the base configuration package using the one or more of the plurality of package functions proposed by the change-proposal function.

2. The method of claim 1, wherein the infrastructure of the application comprises a distributed computing system.

3. The method of claim 1, wherein the change-proposal function specifies an argument of the one or more of the plurality of package functions proposed by the change-proposal function.

4. The method of claim 1, wherein the change-proposal function limits possible values of an argument of the one or more of the plurality of package functions proposed by the change-proposal function.

5. The method of claim 1, wherein the transmitted change-proposal function causes the user device to display the transmitted change-proposal function on a graphical user interface (GUI) executing on the user device.

6. The method of claim 1, wherein the approval of the change-proposal function comprises a change to the change-proposal function.

7. The method of claim 1, wherein determining the change-proposal function comprises applying a validation function to the change-proposal function, the validation function testing each package function against one or more rules.

8. The method of claim 1, wherein determining the change-proposal function comprises:
  determining, for each respective change-proposal function of a plurality of change-proposal functions, a respective score; and
  selecting, based on each respective score, the change-proposal function.

9. The method of claim 1, wherein determining the change-proposal function comprises evaluating, using a model, a plurality of historical configurations of the base configuration package.

10. The method of claim 9, wherein the plurality of historical configurations comprises metadata representative of deployment behavior.

11. A system comprising:
  data processing hardware; and
  memory hardware in communication with the data processing hardware, the memory hardware storing instructions executed on the data processing hardware causing the data processing hardware to perform operations comprising:
    receiving a configuration request requesting configuration management of a base configuration package that describes infrastructure of an application;
    determining, for the base configuration package, a plurality of package functions, each package function of the plurality of package functions extending functionality of the base configuration package;
    determining, for the base configuration package and the plurality of package functions, a change-proposal function, the change-proposal function proposing one or more of the plurality of package functions to extend the functionality of the base configuration package;
    transmitting, to a user device, the change-proposal function;
    receiving, from the user device, approval of the change-proposal function; and
    in response to receiving approval of the change-proposal function, configuring the base configuration package using the one or more of the plurality of package functions proposed by the change-proposal function.

12. The system of claim 11, wherein the infrastructure of the application comprises a distributed computing system.

13. The system of claim 11, wherein the change-proposal function specifies an argument of the one or more of the plurality of package functions proposed by the change-proposal function.

14. The system of claim 11, wherein the change-proposal function limits possible values of an argument of the one or more of the plurality of package functions proposed by the change-proposal function.

15. The system of claim 11, wherein the transmitted change-proposal function causes the user device to display the transmitted change-proposal function on a graphical user interface (GUI) executing on the user device.

16. The system of claim 11, wherein the approval of the change-proposal function comprises a change to the change-proposal function.

17. The system of claim 11, wherein determining the change-proposal function comprises applying a validation function to the change-proposal function, the validation function testing each package function against one or more rules.

18. The system of claim 11, wherein determining the change-proposal function comprises:
  determining, for each respective change-proposal function of a plurality of change-proposal functions, a respective score; and
  selecting, based on each respective score, the change-proposal function.

19. The system of claim 11, wherein determining the change-proposal function comprises evaluating, using a model, a plurality of historical configurations of the base configuration package.

20. The system of claim 19, wherein the plurality of historical configurations comprises metadata representative of deployment behavior.

* * * * *